(12) United States Patent
Heidrich

(10) Patent No.: US 9,656,572 B2
(45) Date of Patent: May 23, 2017

(54) METHOD FOR STARTING A VEHICLE

(71) Applicant: Daimler AG, Stuttgart (DE)

(72) Inventor: Hans-Joerg Heidrich, Ulm (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/650,262

(22) PCT Filed: Nov. 9, 2013

(86) PCT No.: PCT/EP2013/003380
§ 371 (c)(1),
(2) Date: Jun. 5, 2015

(87) PCT Pub. No.: WO2014/090359
PCT Pub. Date: Jun. 19, 2014

(65) Prior Publication Data
US 2016/0185253 A1    Jun. 30, 2016

(30) Foreign Application Priority Data

Dec. 11, 2012  (DE) ........................ 10 2012 024 140

(51) Int. Cl.
| | |
|---|---|
| *B60L 11/18* | (2006.01) |
| *H04L 29/08* | (2006.01) |
| *H04M 1/725* | (2006.01) |
| *B60R 25/20* | (2013.01) |
| *B60L 3/12* | (2006.01) |

(52) U.S. Cl.
CPC ............ *B60L 11/1885* (2013.01); *B60L 3/12* (2013.01); *B60R 25/209* (2013.01);
(Continued)

(58) Field of Classification Search
CPC .. B60L 11/1885; B60L 3/12; B60L 2240/625; B60L 2240/622;
(Continued)

(56) References Cited

U.S. PATENT DOCUMENTS

| | | | |
|---|---|---|---|
| 8,841,040 B2 * | 9/2014 | Limbeck | ........... H01M 8/04007 429/429 |
| 2002/0092690 A1 * | 7/2002 | Benz | ................... B60L 11/1881 180/167 |

(Continued)

FOREIGN PATENT DOCUMENTS

| | | |
|---|---|---|
| DE | 102 58 865 A1 | 7/2004 |
| EP | 1 211 120 A1 | 6/2002 |

(Continued)

OTHER PUBLICATIONS

PCT/EP2013/003380, International Search Report dated Feb. 10, 2015, with partial English translation (Eight (8) pages).

(Continued)

*Primary Examiner* — Anne M Antonucci
(74) *Attorney, Agent, or Firm* — Crowell & Moring LLP

(57) ABSTRACT

A method for starting a motor vehicle with a fuel cell system for providing electrical drive power in the vehicle is disclosed. A starting procedure can be started by a remote control unit independently of the presence of the user in the immediate vicinity of the vehicle. The starting procedure only takes place by the remote control unit if a start signal from the remote control unit exists, and if simultaneously a sensed temperature in the vehicle, the fuel cell system and/or the surroundings of the vehicle is below a predetermined temperature threshold value.

9 Claims, 1 Drawing Sheet

(52) U.S. Cl.
CPC .......... B60R 25/2018 (2013.01); H04L 67/12 (2013.01); H04M 1/72533 (2013.01); *B60L 2240/36* (2013.01); *B60L 2240/622* (2013.01); *B60L 2240/625* (2013.01); *B60L 2240/627* (2013.01); *B60L 2250/12* (2013.01); *B60L 2250/22* (2013.01); *Y02T 10/7291* (2013.01); *Y02T 90/16* (2013.01); *Y02T 90/162* (2013.01); *Y02T 90/34* (2013.01)

(58) Field of Classification Search
CPC .......... B60L 2240/627; B60L 2250/12; B60L 2240/36; B60L 2250/22; H04M 1/72533; H04L 67/12; B60R 25/2018; B60R 25/209; Y02T 10/7291; Y02T 90/34; Y02T 90/162; Y02T 90/16
USPC .......................................................... 701/2
See application file for complete search history.

(56) References Cited

U.S. PATENT DOCUMENTS

| | | |
|---|---|---|
| 2004/0146757 A1 | 7/2004 | Gottwick et al. |
| 2006/0197677 A1 | 9/2006 | Watanabe et al. |
| 2007/0224462 A1* | 9/2007 | Limbeck ........... H01M 8/04007 429/429 |
| 2011/0003215 A1 | 1/2011 | Tanaka et al. |
| 2011/0086668 A1 | 4/2011 | Patel |

FOREIGN PATENT DOCUMENTS

| | | |
|---|---|---|
| FR | 2 815 302 A1 | 4/2002 |
| JP | 2003-42046 A | 2/2003 |
| JP | 2004-22365 A | 1/2004 |
| JP | 2005-73464 A | 3/2005 |
| JP | 2006-44491 A | 2/2006 |

OTHER PUBLICATIONS

PCT/EP2013/003380, German-language Written Opinion dated Feb. 10, 2015 (Five (5) pages).

English Translation of Japanese Office Action issued in Japanese counterpart application No. 2015-545684 dated May 24, 2016 (Four (4) pages).

Chinese Office Action issued in Chinese counterpart application No. 201380064236.5 dated Jan. 12, 2017, with partial English translation (Eleven (11) pages).

\* cited by examiner

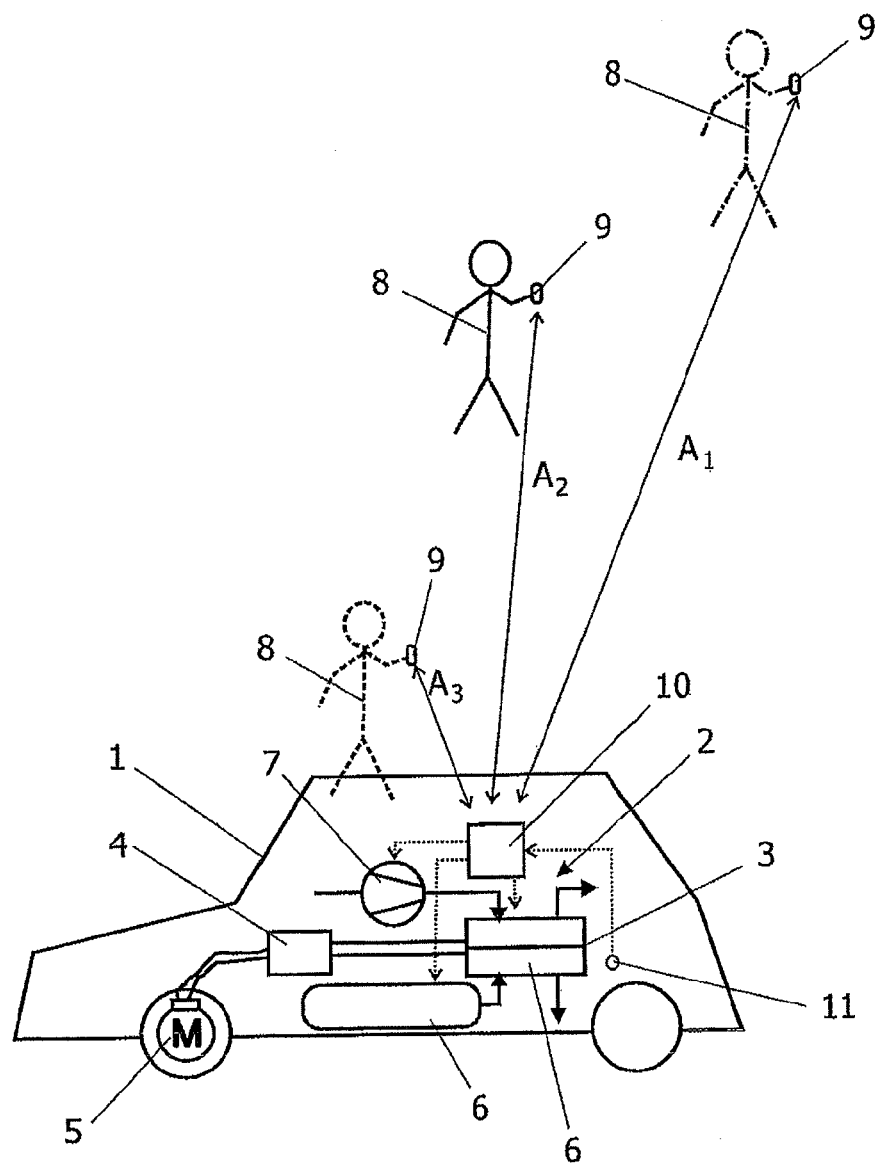

METHOD FOR STARTING A VEHICLE

BACKGROUND AND SUMMARY OF THE INVENTION

The invention relates to a method for starting a vehicle with a fuel cell system.

A device and a method for starting a vehicle with a fuel cell system is known from the generic EP 1 211 120 A1. In the system described there a starting procedure of the fuel cell system is initiated by means of a remote control unit, wherein in particular wireless communication, a telecommunications network or the internet can be used. Thus the start can be initiated or a starting time can be programmed via a mobile telephone or an internet connection. The problem underlying the application was the previously predominant fact that fuel cell systems required a comparatively long time until they could be started. This problem has been largely remedied by the invention. In present-day fuel cell systems this problem no longer arises in the majority of cases. These systems can be started almost instantaneously as soon as they move in a temperature window in which the start is not delayed by any potential formation of ice in the fuel cell.

Further applications from the general prior art which shed light on the topic of remote initiation of the starting of a vehicle, are for example US 2006/0197677 A1 or the US 2011/0086668 A1.

The object of the present invention is to optimize and configure the starting behavior of a fuel cell system under freezing conditions, that is to say at temperatures at which water can freeze in the fuel cell system, to be more convenient for the user of a vehicle equipped with the fuel cell system.

The method according to the invention for starting a vehicle with a fuel cell system for providing electrical drive power in the vehicle, similar to the generic prior art, includes a remote control unit which can trigger the starting procedure independently of the presence of the user in the immediate vicinity of the vehicle. According to the invention it is provided that the start only takes place by means of the remote control unit if on the one hand a start signal from the remote control unit exists, and if simultaneously a sensed temperature in the vehicle, the fuel cell system and/or the surroundings of the vehicle is below a predetermined temperature threshold value. Thus in the method according to the invention a start initiated by the remote control unit only takes place if frozen starting conditions exist and it is highly probable that the start takes place in a condition of the fuel cell system in which there is a danger that liquid water in the fuel cell system has frozen. Under these conditions, even in current fuel cell systems, starting of the fuel cell system can still take a comparatively long time, since for example valve devices and the like must, if need be, first of all be heated and defrosted. Due to the method according to the invention the sensed start time can be correspondingly shortened for the user of the vehicle, because for example already as the user approaches his vehicle the frozen starting procedure of the fuel cell system begins, and the fuel cell system is then very quickly available for the user of the vehicle after getting in and pressing the start button.

In a particularly favorable embodiment of the method according to the invention it is further provided that the predetermined temperature threshold value is predetermined at approximately 0-5° C., preferably approximately 2° C. Such a predetermined value just above 0° C. ensures that, even in the event of a potential deviation of the measured temperature from the temperature at the points on the fuel cell system which are critical with regard to freezing, a safe and reliable initiation of the required frozen start by means of the remote control unit always takes place when in principle there is a danger that water in the fuel cell system may be frozen.

In a further very favorable embodiment of the method according to the invention it is further provided that the remote control unit transmits the start signal after an active operation. Such transmission of the start signal after an active operation enables the user of the vehicle to have an active influence, which for example, as in the case of opening of the vehicle, can be actively initiated by means of a remote control of the central locking system when the user approaches the vehicle.

Additionally or alternatively in a further embodiment of the method according to the invention it may be provided that the remote control unit transmits the start signal automatically if predetermined conditions exist, in particular if the distance of the remote control unit from the vehicle is less than a predetermined distance. In addition to the active control it is also possible to initiate the transmission of the start signal automatically, for example whenever the user of the vehicle with the remote control unit approaches the vehicle, for example moves within a range of less than preferably approximately 100 m around the vehicle. A further embodiment of this idea provides that in spite of the existence of the predetermined conditions the transmission of the start signal from the remote control unit only takes place if the transmission is actively confirmed. This enables the user to have an active influence, by way of example if he has parked the vehicle in front of the building and goes past the vehicle in order, for example, to do his shopping or the like on foot. In this case the initiation of the starting operation, which is comparatively energy-intensive, can be prevented in that the driver is notified appropriately by the remote control unit that a start should be initiated. If he does not confirm this, the start does not take place.

In a further very favorable embodiment it may be provided that if his distance from the vehicle is below a predetermined minimum distance, in particular approximately 2-5 m from the vehicle, the start signal is transmitted without active operation. If the user comes so near to the vehicle that he is within a predetermined minimum distance from it, it may be assumed with a high degree of probability that he wishes to start the vehicle. In this situation it is possible according to the advantageous modification for the active confirmation to be waived and for the start signal to be transmitted in any case.

According to a very favorable modification of the method according to the invention a mobile communication device, such as for example a mobile telephone or mobile telephone integrated in a tablet PC, in particular a program running on the mobile telephone can be used as the remote control unit. Such a use of a mobile telephone or a program, a so-called app, on the mobile telephone enables use with almost any mobile telephone, so that no additional component has to be carried as the remote control unit. The start signal from the remote control unit, in this case the mobile telephone, can then be transmitted to the vehicle via the wireless network of the mobile telephone or a GSM or UMTS network or an internet connection.

Also when a mobile telephone is used as the remote control unit it is possible in particular to use the distance between the remote control unit or the mobile telephone and the vehicle as a condition for initiation of the start in the manner already described above. According to an advantageous embodiment, it may be provided that when the vehicle is parked the parking position of the vehicle is detected by means of the mobile telephone and stored, after which the distance between the vehicle and the mobile telephone is determined by a comparison of positions between the mobile telephone and the stored parking position. It is typically possible for modern mobile telephones, by means of GPS, to use WLAN data or the evaluation of mobile wireless cell data to determine their position comparatively exactly. This determination of position may take place in particular when the vehicle is parked, this parking position being stored. If the user then moves away from the vehicle with his mobile telephone as the remote control unit, this is appropriately recorded. If he later approaches the vehicle again, then by continuous monitoring of the position of the mobile telephone and comparison with the previously stored parking position of the vehicle it is possible to determine the exact distance between the vehicle and the mobile telephone. If this distance falls below the predetermined value, then the procedure already described above for initiation of the start signal can run, for example fully automatically, with a corresponding confirmation by the user or also an optional confirmation depending upon the distance.

Further advantageous embodiments of the method according to the invention are apparent from the rest of the dependent subordinate claims and are made clear with reference to the embodiment which is described in greater detail below with reference to the drawing.

BRIEF DESCRIPTION OF THE DRAWING

The FIGURE shows a schematically indicated vehicle with a fuel cell system, as well as a user of the vehicle with a remote control unit at three different distances (not to scale) from the vehicle.

DETAILED DESCRIPTION OF THE DRAWING

In the FIGURE a schematically indicated vehicle 1 with a fuel cell system 2 can be seen. The fuel cell system 2 can be constructed in a known manner, for example, a PEM fuel cell system 2. It is correspondingly complex and the detailed construction thereof is known to the person skilled in the art. For the sake of simplicity of the representation, therefore, in the FIGURE only a fuel cell 3 has been schematically indicated. By means of the fuel cell 3 electrical power reaches a power electronics 4, which for example supplies electrical drive power to an indicated drive motor 5 in a manner which is known per se. Only one compressed gas storage tank 6 for hydrogen as well as an air conveyor unit 7 which ensures the air or oxygen supply to the fuel cell 3 are shown as further components. Additional components of the fuel cell system such as for example lines, turbines, valves and the like are known to the person skilled in the art from the general prior art. They are not explicitly illustrated here, but of course are present in the fuel cell system 2 in one of the embodiments which is usual in the art.

Starting of the fuel cell system 2 is typically no problem with modern technology and can take place very quickly after a user 8 of the vehicle 1 has got into the vehicle, after pressing of a start button. Only when the temperatures are so low that frozen water in the region of the fuel cell system 2 is to be expected, the starting procedure is somewhat more time-consuming and energy-intensive. For this specific case it is now provided that the user 8 carries a remote control unit 9 with him, which for example may take the form of a program on a mobile telephone. When the vehicle 1 is parked the parking position of the vehicle 1 is stored by means of the remote control unit 9, which is configured for example as a smartphone, and which in a manner which is known per se has possibilities for determining the exact position. If the user 8 then moves away, together with the remote control unit 9, from the vehicle, the remote control unit 9 can continually detect its own position. So long as the user 8 keeps a comparatively large distance from the vehicle 1, it should not be assumed that the user wishes to use the vehicle 1 in the near future. This is indicated by the dash-dot lines indicating the user 8 at the distance A1 from the vehicle. If the user 8 with the remote control unit 9 approaches the distance designated by A2 of, for example, approximately 100 m from the vehicle 1, the system assumes that starting of the vehicle 1 will take place shortly. For this the remote control unit 9 generates a start signal and can transmit this to a control unit 10 in the vehicle 1. Moreover, in the region of the control unit 10 a temperature value of a temperature sensor 11 is evaluated. If this temperature value is below a predetermined threshold temperature of, for example, 2° C., and if at the same time a start signal is present in the region of the control unit 10, the frozen start of the fuel cell system 2 is initiated and the system is prepared appropriately for the impending start by heating and optionally defrosting of components. In order to prevent unnecessary preparation for a start, it may be provided that the remote control unit 9, when it is within the distance A2 from the vehicle 1, prompts the user 8, if the temperature is below the threshold temperature, to transmit the start signal and only transmits this signal when the user 8 has confirmed this, for example by the introduction of a PIN number, a password or also merely confirmation by means of an OK key.

If the user 8 together with the remote control unit 9 is within the distance designated by A3 in the FIGURE, in which the user 8 is represented by a broken line, then the start signal can be transmitted by the remote control unit 9 to the control unit 10, without the need for confirmation, since the distance is then correspondingly small, for example less than 2 m from the vehicle 1 and thus it is to be assumed that the user 8 is approaching the vehicle 1 in order to start it. After the user gets into the vehicle 1, due to the preparation for starting initiated as a function of the threshold temperature and of the start signal, the fuel cell system 2 is then immediately ready to start, even under frozen starting conditions, so that without further delay the user 8 can start and operate the fuel cell system 2 or the user's vehicle 1. This results in considerably improved convenience for the user 8 of the fuel cell vehicle 1 in the event of a frozen start.

The invention claimed is:

1. A method for starting a motor vehicle with a fuel cell system for providing electrical drive power in the motor vehicle, comprising the steps of:
   starting a starting procedure by a remote control unit independently of a presence of a user in an immediate vicinity of the motor vehicle;
   wherein the starting procedure only takes place by the remote control unit if a start signal transmitted from the remote control unit exists, and if simultaneously a sensed temperature in the motor vehicle, the fuel cell system, and/or a surroundings of the motor vehicle is below a predetermined temperature threshold value, and wherein the remote control unit transmits the start signal automatically if a distance of the remote control unit from the motor vehicle is less than a predetermined distance.

2. The method according to claim 1, wherein the predetermined temperature threshold value is approximately 0-5° C.

3. The method according to claim 1, wherein the remote control unit transmits the start signal after an active confirmation by the user.

4. The method according to claim 1, wherein the predetermined distance is approximately 100 m.

5. The method according to claim 1, wherein when the distance is less than a predetermined minimum distance, the remote control unit transmits the start signal without active confirmation by the user.

6. The method according to claim 1, wherein the remote control unit is a mobile communication device.

7. The method according to claim 6, wherein when the motor vehicle is parked a parking position of the motor vehicle is detected by the mobile communication device and stored, after which the distance between the motor vehicle and the mobile communication device is determined by a comparison of a currently detected position of the mobile communication device and the stored parking position of the motor vehicle.

8. The method according to claim 1, wherein the remote control unit is a mobile telephone.

9. The method according to claim 1, wherein the remote control unit is a program running on a mobile communication device.

* * * * *